J. H. FRY.

BICHROMATIC LAMP.

APPLICATION FILED AUG. 25, 1913.

Reissued Nov. 18, 1913.

13,648.

2 SHEETS—SHEET 1.

WITNESSES:

Paul N. Critchlow

Francis J. Tomanon.

INVENTOR

Jesse Howard Fry by Christy and Christy

Atty's

COLUMBIA PLANOGRAPH CO., WASHINGTON, D. C.

J. H. FRY.

BICHROMATIC LAMP.

APPLICATION FILED AUG. 25, 1913.

Reissued Nov. 18, 1913.

13,648.

2 SHEETS—SHEET 2.

WITNESSES:

Paul M. Critchlow

Marcia J. Tomanson

INVENTOR

Jesse Howard Fry by Christy and Christy

Atty's

COLUMBIA PLANOGRAPH CO., WASHINGTON, D. C.

UNITED STATES PATENT OFFICE.

JESSE HOWARD FRY, OF ROCHESTER, PENNSYLVANIA.

BICHROMATIC LAMP.

13,648. Specification of Reissued Letters Patent. Reissued Nov. 18, 1913.

Original No. 1,021,458, dated March 26, 1912, Serial No. 629,000. Application for reissue filed August 25, 1913. Serial No. 786,616.

*To all whom it may concern:*

Be it known that I, JESSE HOWARD FRY, residing at Rochester, in the county of Beaver and State of Pennsylvania, a citizen of the United States, have invented or discovered certain new and useful Improvements in Bichromatic Lamps, of which improvements the following is a specification.

My invention has to do with lamps, used particularly on transports such as motor-boats, vehicles and automobiles either to restrict the rays of light of an illuminating source to one or more general directions or to cast rays of light of different colors in different directions. And the object of my invention is to provide a neat, durable and efficient lamp constructed entirely of glass.

In the accompanying drawings, which form part of the specification, two forms of lamps embodying my invention are shown.

Figure 1:
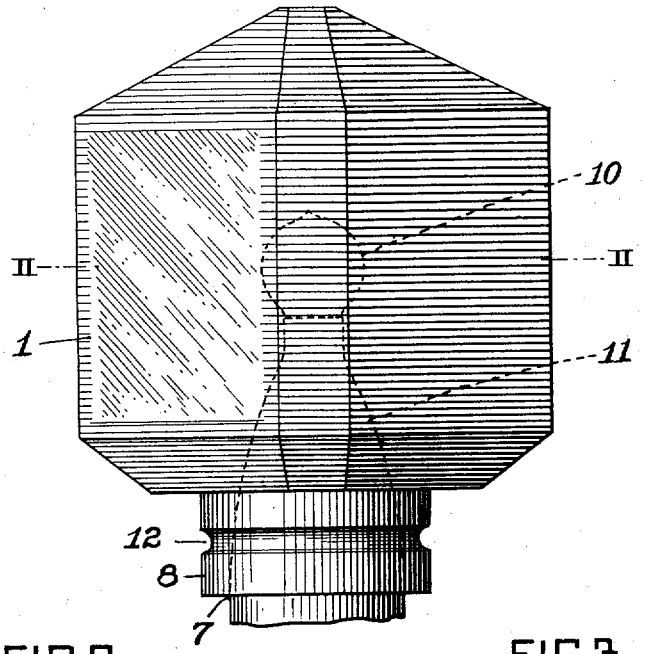
Figure 2:
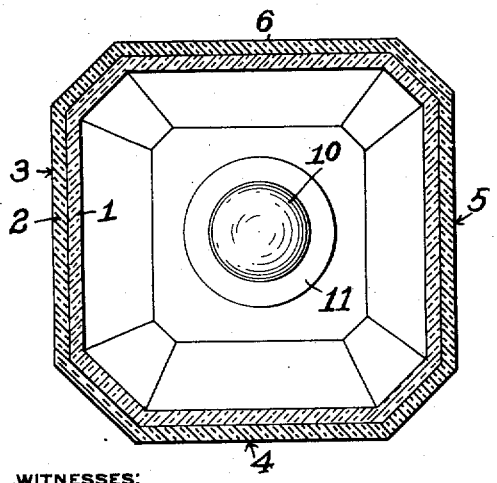
Figure 3:
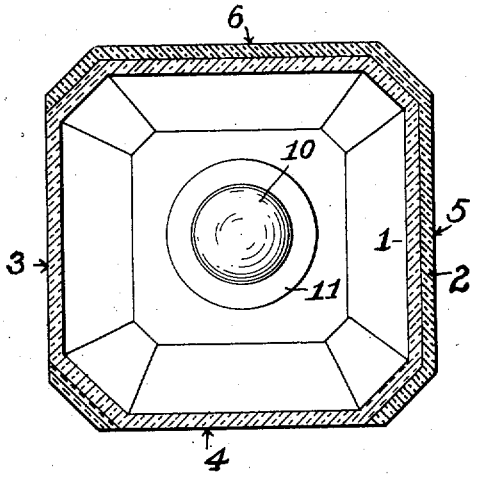
Figure 4:
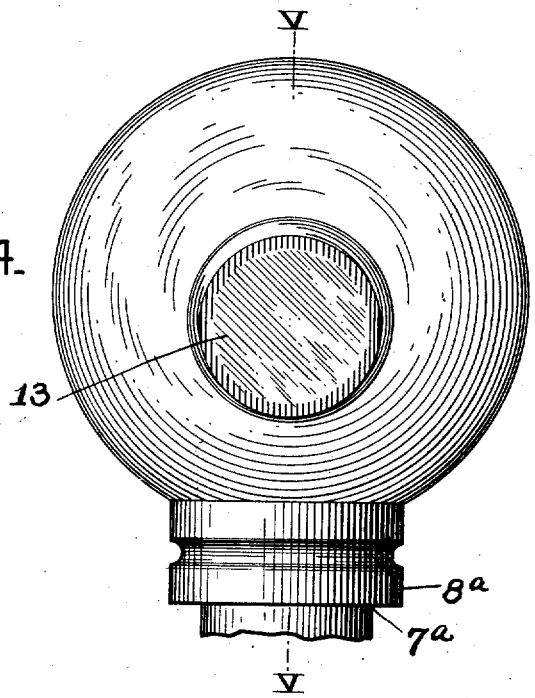

Figure 1 is an elevation of an angularly-shaped lamp; Fig. 2 a section taken on the line II II, Fig. 1, showing the lamp as it appears in the preferred course of its manufacture; Fig. 3 a section taken on the line II II, Fig. 1, showing the lamp as completed; Fig. 4 an elevation of a spherically-shaped lamp; and Fig. 5 a vertical section taken on the line V V, Fig. 4.

In the several figures like numerals are used to designate like parts.

In the preferred construction or manufacture of lamp globes embodying my invention use is made of the well-known process of "casing", which consists of uniting, while hot, layers of glass having different colors or characteristics and removing whatever portions are desired after the article has been formed and when the glass is cool.

For the sake of definiteness my invention is described as applied to lamps, such as are used on automobiles and are called "side-lamps" and "tail-lamps". It is usually desirable in a side-lamp for an automobile to have rays of white light cast to the front and to the side away from the machine on which the lamp is secured, and to have no light cast to the rear and inside. To construct such a lamp entirely of glass and by the casting process, a gather of molten clear glass is made upon a blow-pipe, which is then inserted into a molten mass of opal or black glass either of which when cooled will be opaque. The compound gather of glass is then inserted into a shaping mold and properly blown to conform thereto. While such a lamp may be of any desired form, it may conveniently be of such shape as is shown in Figs. 1, 2 and 3. When such a shape is used the two layers of glass, when cooled, will be disposed as is shown in Fig. 2, the inner layer 1 being of clear glass and the outer layer 2 of opaque glass, and the faces 3 and 4 will preferably be somewhat smaller than the faces 5 and 6, so that, when the opaque glass is ground or otherwise removed from the first named faces, the lamp as a whole will be of a regular and symmetrical shape. An opening 7 is formed in the bottom of the lamp for the reception of a suitable electric light 10, which light is preferably mounted upon a block 11, extending through the said opening 7. A sleeve 8, forming an extension of the said opening 7 and grooved as at 12 to permit of attachment to a support, is formed integrally with the body portion of the lamp.

Fig. 3 shows the arrangement of the two layers of glass after the opaque glass has been ground from the faces 3 and 4. It will readily be seen that a lamp so constructed will transmit light, from such a source as the electric lamp 10, only through the clear glass faces from which the opaque glass has been removed. Furthermore while a lamp of such angular form as shown may be used for a tail-lamp, it is found to be best adapted for use as a side-lamp and when so used and properly placed upon an automobile the light will be projected only to the front and the side of the machine.

It is usually required, by laws governing the use of automobiles, that, at night, a red light be shown at the rear and a white light be directed upon the license number of the machine. The lamp shown in Figs. 1, 2 and 3 might be well adapted to such use by covering the clear glass with a layer of red glass, after the manner already described, and removing the red glass from one face, which, in the use of the lamp, would be turned in a position to direct white light upon the license number. However, to more definitely fulfil the requirements of a tail-lamp, I preferably use a spherically-shaped lamp, such as is shown in Figs. 4 and 5, and provide a plane faced bull's-eye 13, from which the red glass may be removed.

Figure 5:
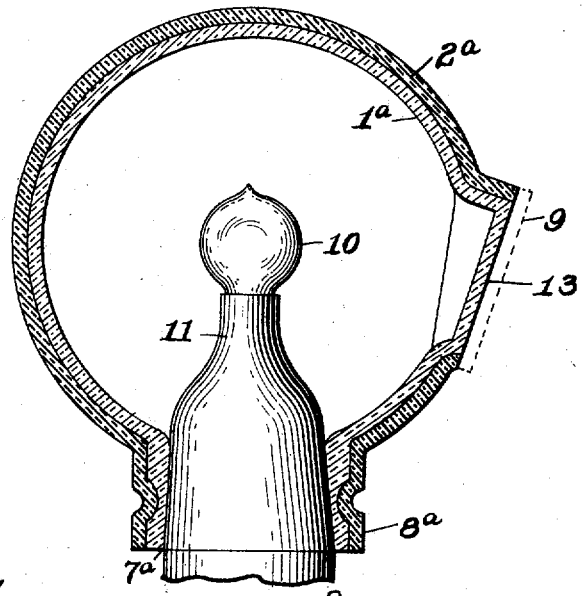

In Fig. 5 the clear glass is indicated at $1^a$ and the superadded layer of red glass at $2^a$. The bull's-eye 13 is preferably a circular plane face and may be inclined to the general axis of the lamp to the end that the lamp may be placed rearward of and cast a beam of light upon the license number. It will be understood of this construction that a layer of red glass originally covering the bull's-eye may be removed from the face of the bull's-eye 13, as indicated by dotted line 9, to permit of the passage of a beam of white light through the bull's-eye, and that a red light will be seen in all directions except in front of the bull's-eye. The further details of construction of the spherically-shaped lamp consists of an appended attaching sleeve $8^a$, provided with an opening $7^a$ through which a suitable electric light may be inserted, similar to the construction heretofore described in connection with Figs. 1, 2 and 3.

I do not wish to limit myself to the colors of glass or the manner of manufacturing the globe described herein or to the forms of lamp shown, for, obviously, many changes may be made by those skilled in the art without departing from the spirit of my invention.

I claim herein as my invention:

1. A glass globe for a pilot-light having a plane face formed as a part thereof and having a single opening, the globe body consisting of an inner layer of glass of one color forming the complete globe structure, and an outer layer of glass of a different color integrally united with the said inner layer and covering the said inner layer except the plane-face portion thereof.

2. A globe for a pilot-light having a plane face formed as a part thereof and having a single opening therein, the complete globe being formed of an integral body of glass, the glass forming the outer portion of the globe except said plane face being colored, and the glass forming the inner portion and all of said plane face being clear, whereby a substantially white illuminating light may be transmitted through said plane face and a colored signal light through the other portion of the globe body.

In testimony whereof, I have hereunto set my hand.

JESSE HOWARD FRY.

Witnesses:

LEMAN W. DOLBY,
ALBERT SULSER.

Copies of this patent may be obtained for five cents each, by addressing the "Commissioner of Patents, Washington, D. C."